United States Patent
Uota

(10) Patent No.: US 6,585,615 B2
(45) Date of Patent: Jul. 1, 2003

(54) POWER TRANSMISSION RING AND VARIABLE DIAMETER PULLEY ASSEMBLY USING THE SAME

(75) Inventor: Masashi Uota, Yamatokoriyama (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/777,923

(22) Filed: Feb. 7, 2001

(65) Prior Publication Data

US 2001/0019975 A1 Sep. 6, 2001

(30) Foreign Application Priority Data

Feb. 17, 2000 (JP) ........................................ 2000-039705
Feb. 18, 2000 (JP) ........................................ 2000-040884

(51) Int. Cl.$^7$ ................................................ F16G 1/22
(52) U.S. Cl. ........................................ 474/242; 474/17
(58) Field of Search ............................ 474/94, 17, 18, 474/28, 204, 242, 244, 238, 250, 255, 270

(56) References Cited

U.S. PATENT DOCUMENTS

| 2,695,530 | A | * | 11/1954 | Calzolari | .................... 474/100 |
| 3,368,728 | A | * | 2/1968 | Gusmestad | .................. 226/172 |
| 3,981,205 | A | * | 9/1976 | Avramidis et al. | ............. 474/13 |
| 4,321,049 | A | * | 3/1982 | Tangorra et al. | ............. 474/242 |
| 4,457,743 | A | * | 7/1984 | Robecchi et al. | ............. 474/260 |
| 4,867,733 | A | * | 9/1989 | Yamanoi et al. | ............. 474/161 |
| 6,017,285 | A | * | 1/2000 | Yasuhara et al. | ............. 474/12 |
| 6,106,422 | A |   | 8/2000 | Arai | ............................ 474/100 |
| 6,129,643 | A | * | 10/2000 | Tamagawa et al. | ............. 474/8 |
| 6,248,035 | B1 | * | 6/2001 | Bartlett | ........................ 474/13 |

FOREIGN PATENT DOCUMENTS

| JP | 2-146352 | * | 6/1990 | .................. 474/100 |
| JP | 3-33544 | * | 2/1991 | .................. 474/169 |
| JP | 6-147275 | * | 5/1994 | .................. 474/201 |
| JP | 11-030300 |   | 2/1999 |   |
| WO | 94/29616 |   | 12/1994 |   |
| WO | WO-99/17038 | * | 4/1999 | ........... F16H/55/30 |

* cited by examiner

Primary Examiner—Thomas R. Hannon
Assistant Examiner—Vicky A. Johnson
(74) Attorney, Agent, or Firm—Smith, Gambrell & Russell

(57) ABSTRACT

In a power transmission ring, a plastic ring is provided with first and second tapered raceway surfaces on one and the other of lateral surfaces thereof, the first and second tapered raceway surfaces conforming to first and second power transmission surfaces of first and second sheaves, respectively. A metallic ring is provided with first and second tapered surfaces on one and the other of lateral surfaces thereof in parallel relation with the first and second raceway surfaces, respectively, and unified with the plastic ring.

20 Claims, 14 Drawing Sheets

POWER TRANSMISSION RING AND VARIABLE DIAMETER PULLEY ASSEMBLY USING THE SAME

FIELD OF THE INVENTION

The present invention relates to a power transmission ring held between a pair of sheaves and a variable diameter pulley assembly using the same.

DESCRIPTION OF THE PRIOR ART

Heretofore, there have been proposed variable diameter pulley assemblies adapted to vary an effective radius (contact radius) for a belt looped over a pulley. An exemplary pulley assembly of this type has the following configuration, as shown in FIG. 14. A pair of sheaves 100 is each formed with a tapered power transmission surface 101 and is allowed to be axially moved relative to each other with their power transmission surfaces 101 opposed each other. A power transmission ring 102 with a belt B looped over its outer periphery is held between the pair of power transmission surfaces 101 as allowed to be decentered relative to an axis of the sheaves 100. On the other hand, a coned disk spring 103 biases one of the sheaves 100 toward the other sheave 100 (see, for example, Japanese Unexamined Patent Publication No.11 (1999)-30300).

In the variable diameter pulley assembly of this type, the power transmission ring 102 is constructed from a metal, such as an aluminum alloy, or a synthetic resin material. The power transmission ring 102 is formed with tapered raceway surfaces 105 on its lateral sides, the raceway surfaces 105 shaped in conformity with the power transmission surfaces 101.

The conventional variable diameter pulley assembly effects torque transfer between the power transmission surfaces 101 of the sheaves 100 and the raceway surfaces 105 of the power transmission ring 102. During the torque transfer, both the power transmission surfaces 101 and the raceway surfaces 105 are subject to a significantly increased surface pressure because of a small contact area therebetween. Besides, both the surfaces contact each other in a complicated state involving rolling contact for torque transfer and sliding contact produced when the power transmission ring 102 is decentered. Therefore, the metallic power transmission ring 102 is prone to seize on the power transmission surfaces 101. Although less liable to suffer seizure, the power transmission ring 102 of the synthetic resin has a lower strength than the metallic ring. In the event of a breakage, the power transmission ring 102 of the synthetic resin material will be crushed to become unable to transfer torque. This may result in a case where an automobile becomes inoperable if such a variable diameter pulley assembly is employed for driving an auxiliary machine such as an automotive alternator.

OBJECT AND SUMMARY OF THE INVENTION

In view of the foregoing, it is an object of the invention to provide a power transmission ring and a variable diameter pulley assembly using the same which are less likely to encounter the seizure and capable of accomplishing a desired strength and which are capable of temporarily transferring torque even in the event of a breakage of a plastic portion.

In accordance with the invention for achieving the above object, a power transmission ring comprises:

an outer periphery with a belt looped thereover;

a plastic ring held between first and second power transmission surfaces, each formed on a corresponding lateral surface of first and second sheaves opposed each other, as allowed to be decentered relative to an axis of the first and second sheaves, having first and second tapered raceway surfaces formed on one and the other of lateral surfaces thereof in parallel relation with the first and second power transmission surfaces, respectively, and allowing the first and second raceway surfaces to be contacted by the first and second power transmission surfaces, respectively; and a metallic ring having first and second tapered surfaces formed on one and the other of lateral surfaces thereof in parallel relation with the first and second raceway surfaces, respectively, and unified with the plastic ring.

The variable diameter pulley assembly of the invention comprises:

first and second sheaves axially relatively movable as presenting first and second power transmission surfaces to each other, the power transmission surfaces each formed on a corresponding lateral surface of the first and second sheaves;

a resilient member for biasing at least one of the sheaves toward the other; and a power transmission ring including:

an outer periphery with a belt looped thereover;

a plastic ring held between the first and second power transmission surfaces as allowed to be decentered relative to an axis of the first and second sheaves, having first and second tapered raceway surfaces formed on one and the other of lateral surfaces thereof in parallel relation with the first and second power transmission surfaces, respectively, and allowing the first and second raceway surfaces to be contacted by the first and second power transmission surfaces, respectively; and a metallic ring having first and second tapered surfaces formed on one and the other of lateral surfaces thereof in parallel relation with the first and second raceway surfaces, respectively, and unified with the plastic ring.

According to the power transmission ring and variable diameter pulley assembly of the above configurations, the first and second raceway surfaces are constructed with the plastic ring. Hence, the first and second raceway surfaces of the plastic ring are less likely to seize on the first and second power transmission surfaces of the first and second sheaves. Since the metallic ring is unified with the plastic ring, a desired strength can be accomplished. Furthermore, the first and second tapered surfaces are respectively formed in parallel with the first and second raceway surfaces, so that even in the event of a crush of the plastic ring, the first and second tapered surfaces are allowed to engage the first and second power transmission surfaces, respectively, for temporary torque transfer therebetween.

DESCRIPTION OF THE PREFERRED EMBODIMENTS

Preferred embodiments of the present invention will hereinbelow be described with reference to the accompanying drawings.

First Embodiment

Figure 1:
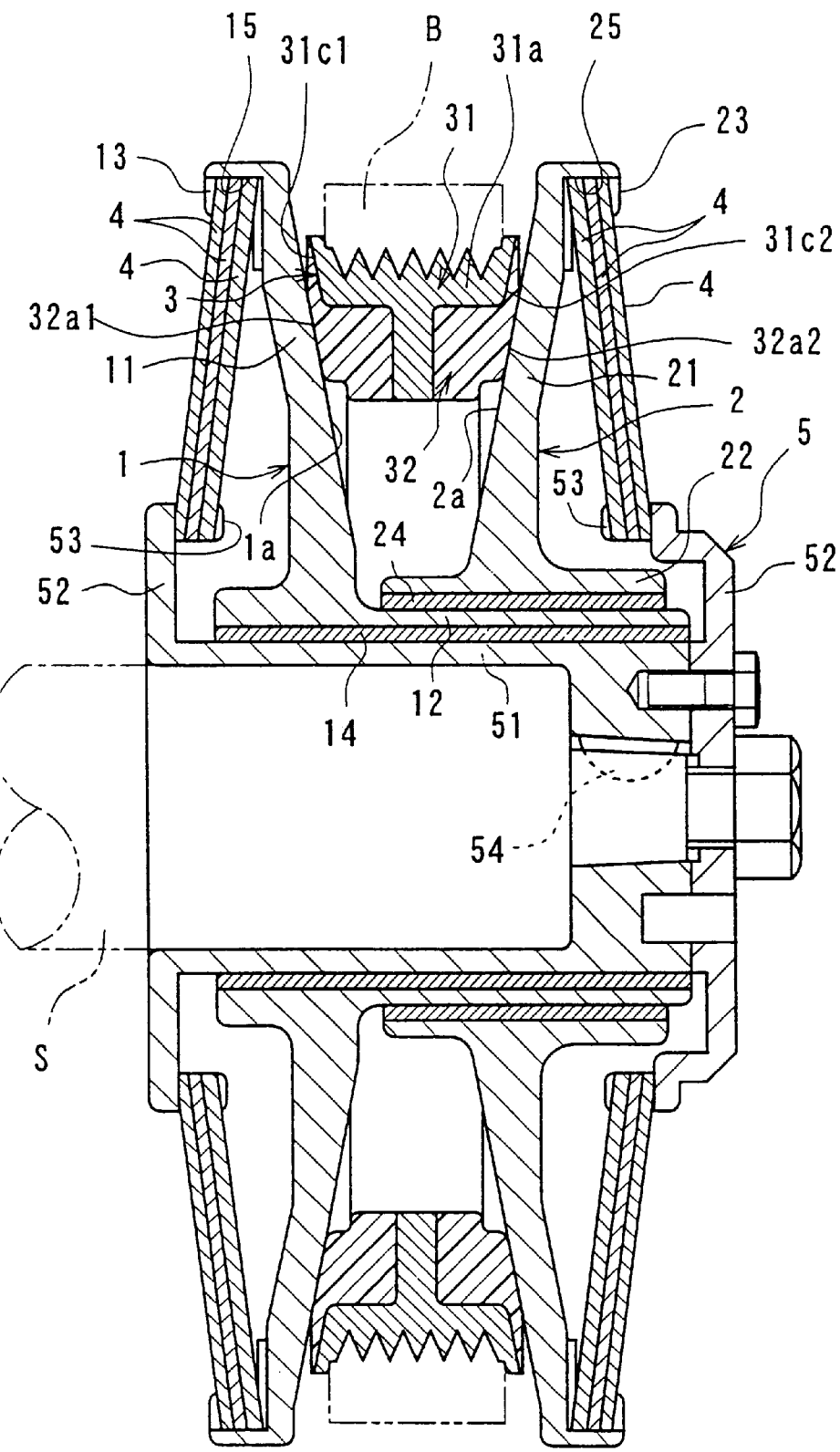
FIG. 1 is a sectional view showing a variable diameter pulley assembly according to a first embodiment of the present invention.

FIG. 1 is a sectional view showing a variable diameter pulley assembly according to a first embodiment of the present invention. This variable diameter pulley assembly is employed as, for example, a driven pulley for driving an auxiliary machine such as an alternator mounted to an automotive engine. The variable diameter pulley assembly essentially consists of a first sheave 1 and a second sheave 2 disposed concentrically with a rotary shaft S as a driven shaft as opposed each other; a power transmission ring 3 having a belt (V-ribbed belt) B looped over its outer periphery and held between the pair of sheaves 1, 2; coned disk springs 4 serving as a resilient member for biasing the sheaves 1, 2 closer to each other; and a spring retainer 5 for holding the coned disk springs 4 at places.

The first sheave 1 is configured such that a disk-like annular main body 11 is formed with a cylindrical boss 12 on its inner peripheral side and with an annular rim 13 on its outer peripheral side. The boss 12 extends to a rear side of the second sheave 2 in parallel with an axis of the rotary shaft S. The rim 13 projects outwardly of the main body 11. A first tapered power transmission surface 1a, as a torque transfer surface, is defined on a lateral surface of the main body 11 in opposed relation with the second sheave 2. The first power transmission surface 1a is in contact with one of the lateral surfaces of the power transmission ring 3.

Figure 2:
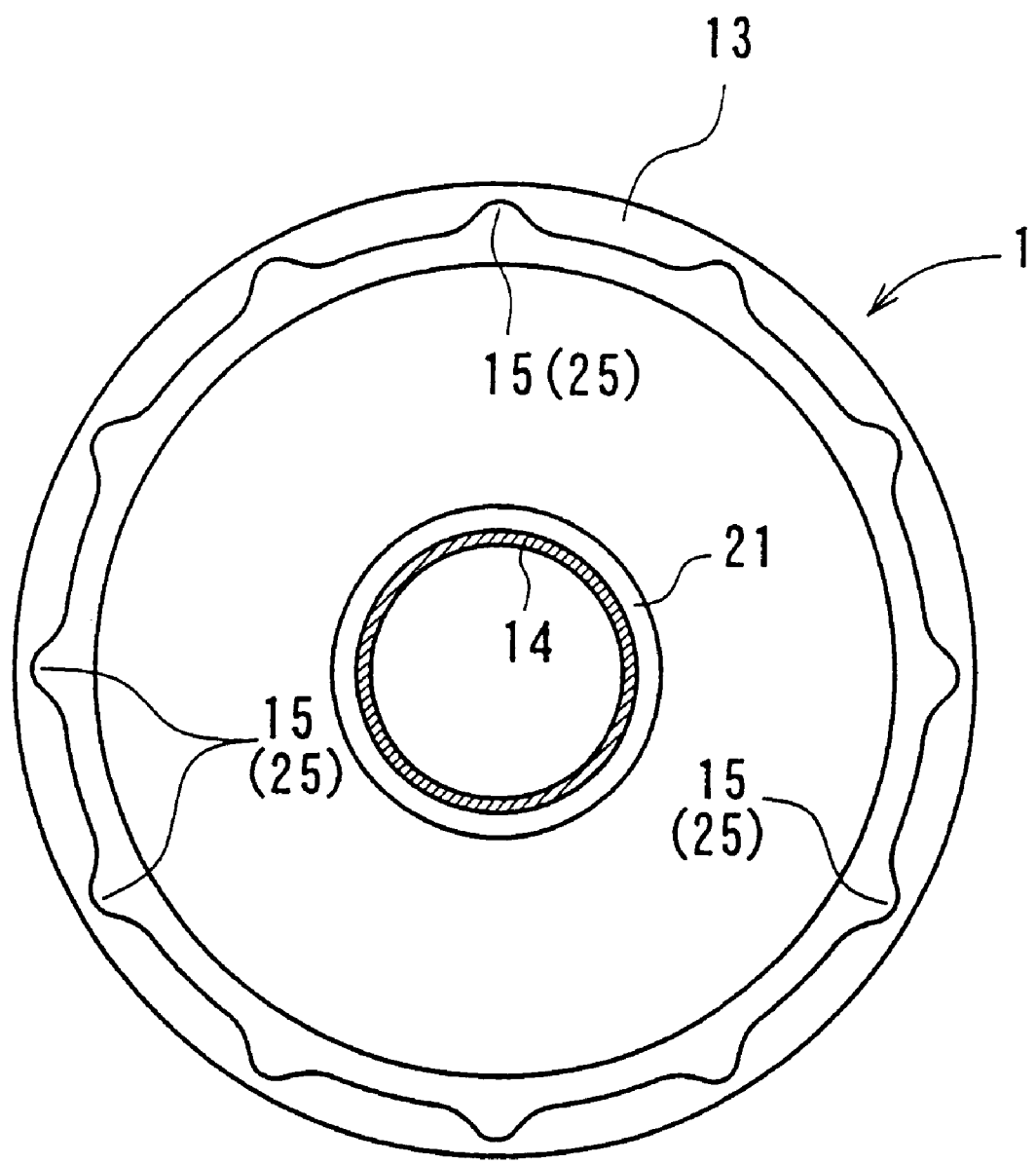
FIG. 2 is a side view showing a sheave depicted in FIG. 1.

The boss 12 is axially slidably fitted over a sleeve 51 (to be described hereinlater) of the spring retainer 5 via a bushing 14 serving as a slide bearing. The rim 13 is provided with a plurality of recesses 15 regularly spaced along its circumference for fittedly receiving an outer perimeter of one of the coned disk springs 4 (see FIG. 2).

The second sheave 2 is configured substantially symmetrical to the first sheave 1. The second sheave 2 is configured such that a disk-like annular main body 21 is formed with a cylindrical boss 22 on its inner peripheral side and with an annular rim 23 on its outer peripheral side. The boss 22 extends in parallel with the axis of the rotary shaft S whereas the rim 23 projects outwardly of the main body 21. A second tapered power transmission surface 2a, as the torque transfer surface, is defined on a lateral surface of the main body 21 in opposed relation with the first sheave 1. The second power transmission surface 2a consists of an oppositely tapered surface relative to the first power transmission surface 1a of the first sheave 1 so that an annular space of a V-shaped section may be defined between the first power transmission surface 1a of the first sheave 1 and the second power transmission surface 2a. The second power transmission surface 2a is in contact with the other lateral surface of the power transmission ring 3.

The boss 22 is axially slidably fitted over the boss 12 of the first sheave 1 via a bushing 24 serving as a slide bearing. The rim 23 is provided with a plurality of recesses 25 regularly spaced along its circumference for fittedly receiving an outer perimeter of the other coned disk spring 4 (see FIG. 2).

Figure 3:
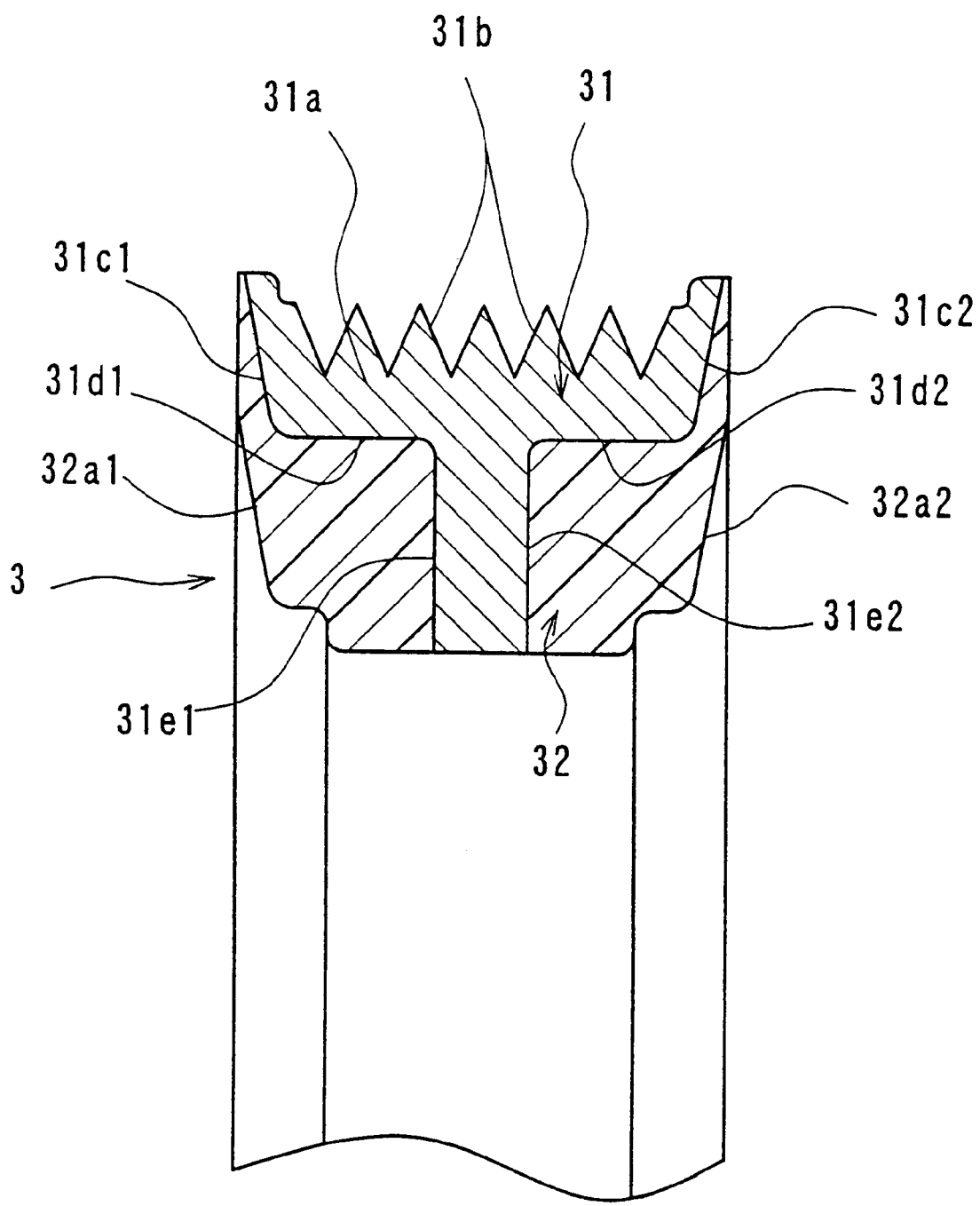
FIG. 3 is an enlarged sectional view showing an essential part of a power transmission ring depicted in FIG. 1.

Also referring to FIG. 3, the power transmission ring 3 is reinforced by embedding a metallic ring 31 in a plastic ring 32, the metallic ring 31 constructed from iron, an aluminum alloy or the like.

The metallic ring 31 is of a T-shaped sectional form. The metallic ring 31 is embedded in the plastic ring 32 as allowing its outer periphery and minimum diameter portion to be exposed from the plastic ring 32. A great width portion on the outer periphery of the metallic ring 31 defines an annular belt-engagement portion 31a over which a belt B is looped. A plurality of V-grooves 31b are extended in an outer peripheral surface of the belt-engagement portion 31a for receiving ribs on an inner peripheral surface of the belt B. The belt-engagement portion 31a is formed with first and second annular tapered surfaces 31c1, 31c2 on one and the other lateral surfaces thereof in parallel with the first and second power transmission surfaces 1a, 2a of the first and second sheaves 1,2, respectively. The first and second tapered surfaces 31c1, 31c2 are embedded in the plastic ring 32 in a manner to come into contact with the corresponding first and second power transmission surfaces 1a, 2a in the event of a breakage of the plastic ring 32. Thus, the first and second tapered surfaces 31c1, 31c2 are normally separate from the first and second power transmission surfaces 1a, 2a. By virtue of the first and second tapered surfaces 31c1, 31c2 thus embedded in the plastic ring 32, the first and second tapered surfaces 31c1, 31c2 are maintained out of contact with the first and second power transmission surfaces 1a, 2a except when the plastic ring 32 is destroyed. As a result, it is ensured that the seizure of the tapered surfaces 31c1, 31c2 is prevented. In order to enhance the joining strength between the metallic ring 31 and the plastic ring 32, the metallic ring 31 has its joined surface with the plastic ring 32 roughened by knurling.

The plastic ring 32 is joined to the first and second tapered surfaces 31c1, 31c2 of the metallic ring 31, first and second inner peripheral surfaces 31d1, 31d2 respectively continuous to the first and second tapered surfaces 31c1, 31c2, and first and second lateral surfaces 31e1, 31e2 respectively continuous to the first and second inner peripheral surfaces 31d1, 31d2. The plastic ring 32 is formed with first and second raceway surfaces 32a1, 32a2 on one and the other of lateral surfaces thereof in parallel with the first and second power transmission surfaces 1a, 2a, respectively. The first and second raceway surfaces 32a1, 32a2 are located radially inwardly relative to the first and second tapered surfaces 31c1, 31c2 of the metallic ring 31, constantly maintaining contact with the respective first and second power transmission surfaces 1a, 2a via at least one circumferential place thereof.

Preferred as a material for the plastic ring 32 is, for example, a phenol resin incorporating a carbon fiber, an aromatic polyamide fiber and graphite. Such a material is superior in strength and wear resistance but low in attack on the first and second power transmission surfaces 1a, 2a.

The metallic ring 31 is unified with the plastic ring 32 during an insert molding of the plastic ring 32.

Figure 4:
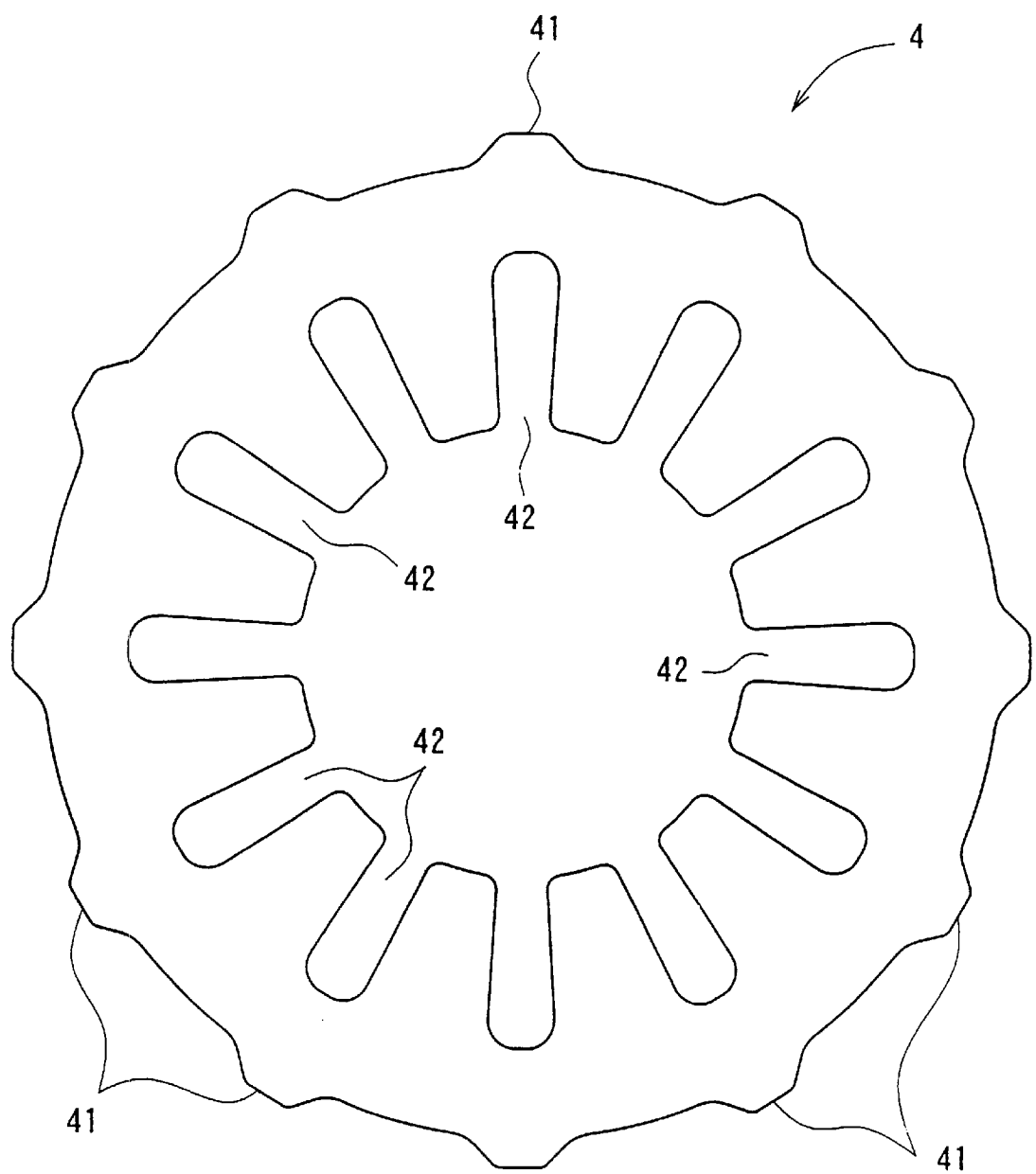
FIG. 4 is a side view showing a coned disk spring depicted in FIG. 1.
Figure 5:
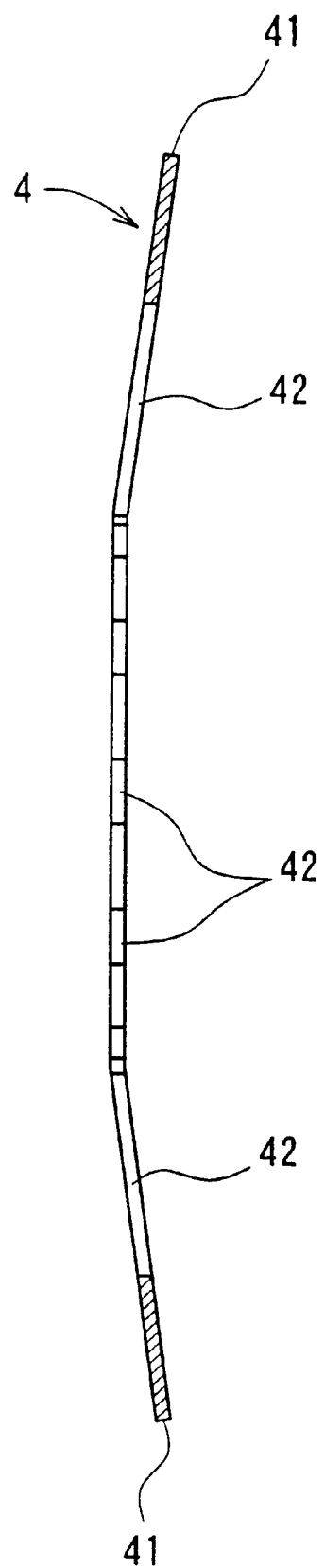
FIG. 5 is a sectional view showing the coned disk spring of FIG. 1.

The coned disk spring 4 consists of a stack of plural springs, each spring stack disposed on each of lateral sides. As shown in FIGS. 4 and 5, the coned disk spring 4 is formed with a plurality of protrusions 41 regularly spaced along an outer perimeter thereof and in correspondence to the recesses 15 or 25 of the sheave 1 or 2, and with a plurality of slits 42 radially extended from its inner circumference to its intermediate portion. Each coned disk spring 4 is interposed between the sheave 1 or 2 and the spring retainer 5 with its protrusions 41 fitted in the recesses 15 or 25 of the sheave 1 or 2 and its slits 42 fitted in projections 53 (to be described hereinlater) of the spring retainer 5, and in a state resiliently deformed by a predetermined amount. In this state, the coned disk springs operate to bias the sheaves 1, 2 closer to each other.

The spring retainer 5 includes the sleeve 51 in fitted engagement with the first sheave 1, and a pair of disk-like pressure plates 52 disposed at opposite ends of the sleeve 51. The pair of pressure plates 52 are disposed on rear sides of the sheaves 1, 2, respectively. One of the pressure plates 52 is formed integrally with the sleeve 51 whereas the other pressure plate 52 is secured to an end of the sleeve 51 with bolt. The projections 53 are provided on an outer perimeter of the pressure plate 52 as regularly spaced therealong for fittedly receiving the slits 42 of the coned disk spring 4. The sleeve 51 is fitted over the rotary shaft S of the auxiliary machine via a key 54 for integral rotation therewith, thereby transferring torque to the rotary shaft S.

Figure 6:
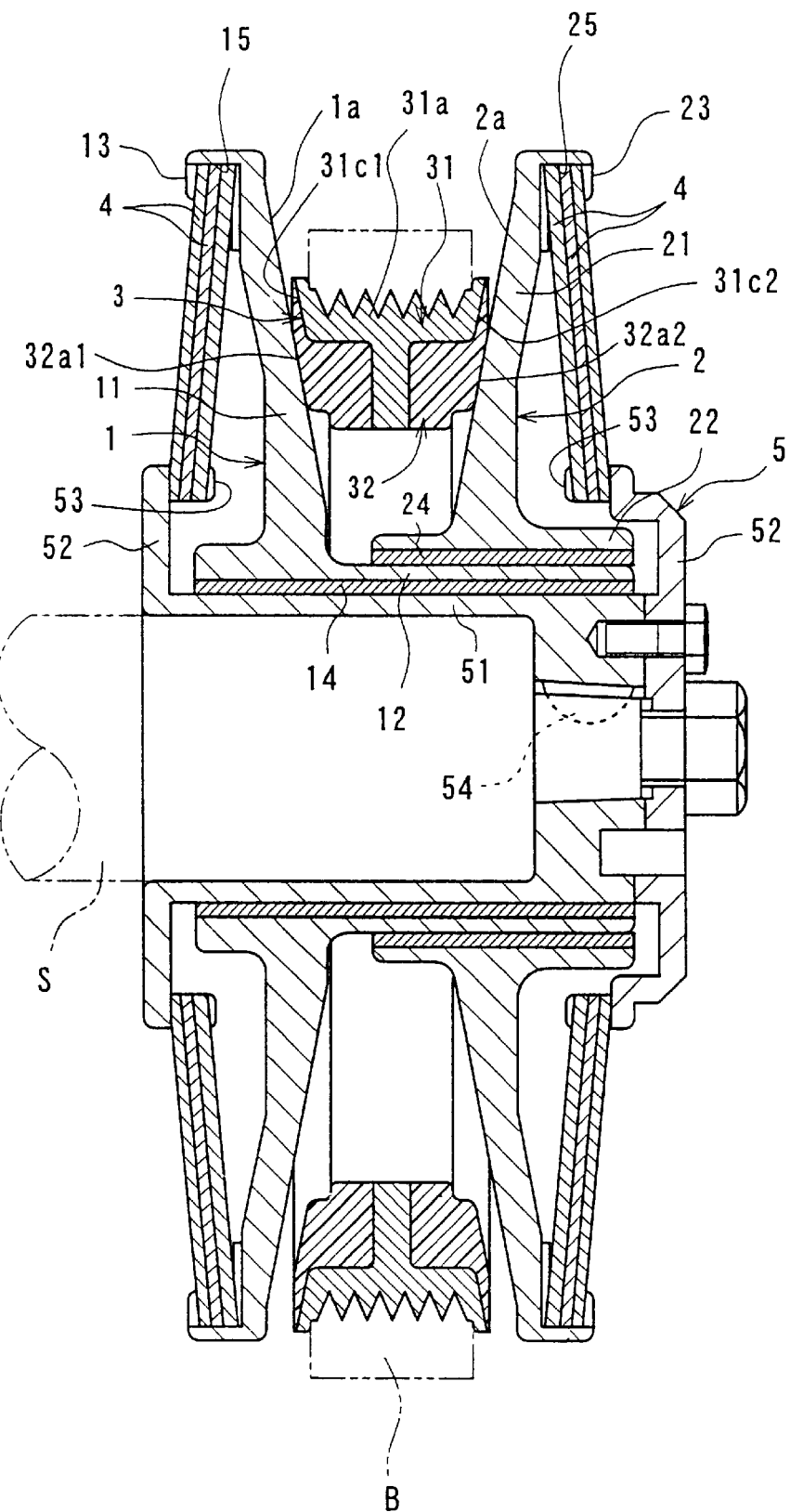
FIG. 6 is a sectional view showing the variable diameter pulley assembly with the power transmission ring of FIG. 1 decentered.

The variable diameter pulley assembly is adapted to transmit a driving force of the belt B to the rotary shaft S via the power transmission ring 3, sheaves 1, 2, coned disk springs 4 and spring retainer 5. At this time, the rotational speed of the rotary shaft S may be automatically adjusted according to a tension of the belt B. For instance, when the tension of the belt B is increased by an unillustrated tension adjustment mechanism, the power transmission ring 3 is decentered relative to the sheaves 1, 2 as moving the sheaves 1, 2 away from each other against the biasing force of the coned disk springs 4 (see FIG. 6). This reduces the effective radius for the belt B looped over the power transmission ring 3, so that a speed-up ratio thereof is increased. When the tension of the belt B is lowered from this state to below a predetermined value, the biasing force of the coned disk springs 4 brings the sheaves 1, 2 closer to each other so that the power transmission ring 3 eventually comes into concentric relation with the sheaves 1, 2 (see FIG. 1). This increases the effective radius for the belt B looped over the power transmission ring 3 and the speed-up ratio thereof is lowered.

In the variable diameter pulley assembly of the above configuration according to the first embodiment, since the first and second raceway surfaces 32a1, 32a2 of the power transmission ring 3 are formed of the resin material, the first and second raceway surfaces 32a1, 32a2 are less likely to seize on the respective first and second power transmission surfaces 1a, 2a. In addition, a desired strength can be accomplished by virtue of the unification of the metallic ring 31 with the plastic ring 32. Furthermore, if the plastic ring 32 be crushed, the first and second tapered surfaces 31c1, 31c2 of the metallic ring 31 will come into contact with the first and second power transmission surfaces 1a, 2a, respectively, for providing a continued torque transfer therebetween. This permits a temporary driving of the automotive auxiliary machine such as an alternator, thereby preventing the automobile from becoming inoperable.

As mentioned supra, the power transmission ring 3 of the present embodiment achieves an increased joining strength between the metallic ring 31 and the plastic ring 32 by rough machining the joined surface therebetween. Depending upon a material for or dimensions of the metallic ring 31 or the plastic ring 32, however, there may be a case where the insert molding results in the production of a gap between the metallic ring 31 and the plastic ring 32 because of a difference in the amounts of shrinkage of the metallic ring 31 and the plastic ring 32. Consequently, the number of fabrication steps is increased because a bonding operation using an adhesive is required for maintaining the joining strength. The following second embodiment negates the need for such a bonding operation.

Second Embodiment

Figure 7:
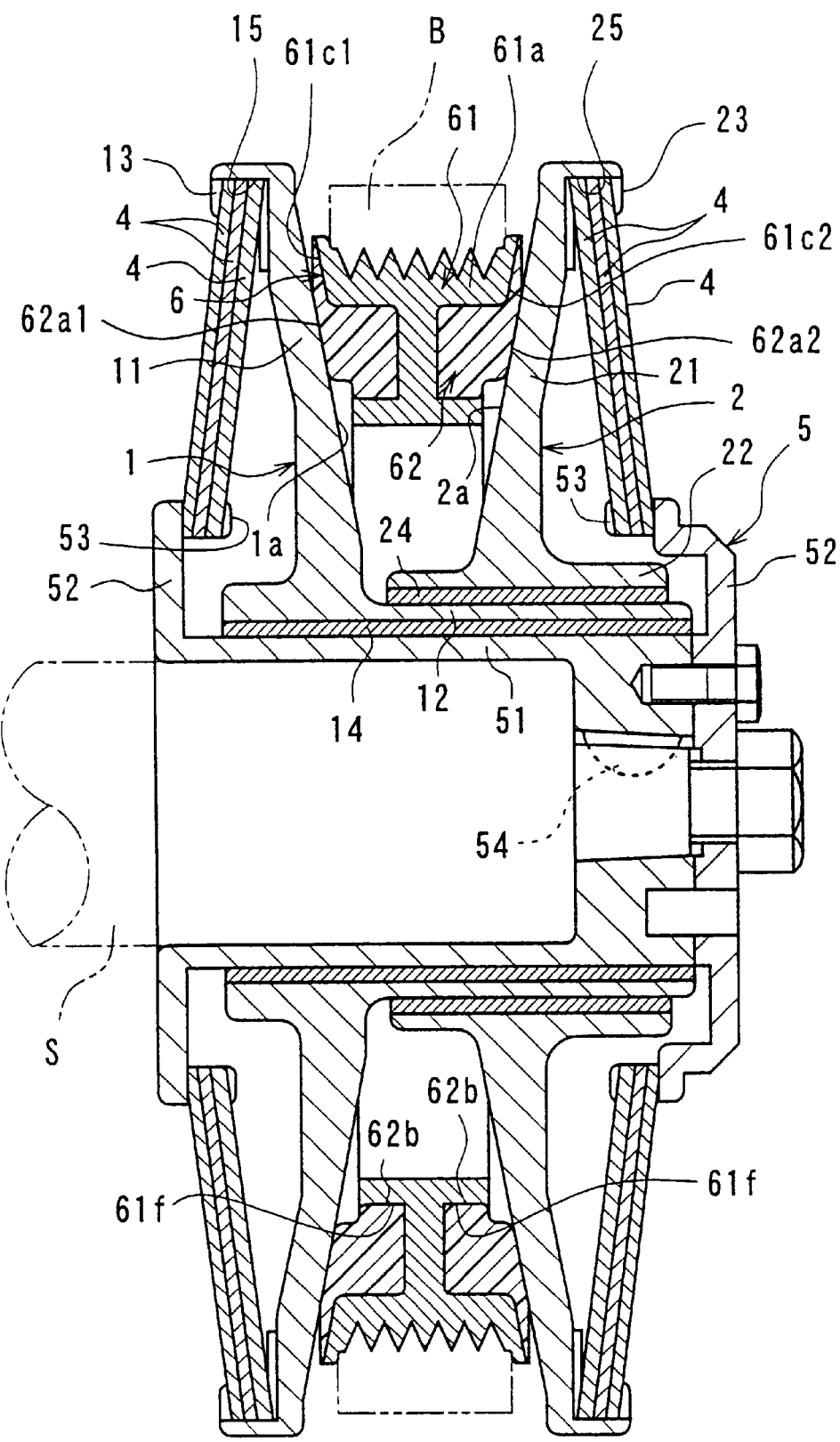
FIG. 7 is a sectional view showing the variable diameter pulley assembly according to a second embodiment of the present invention.
Figure 8:
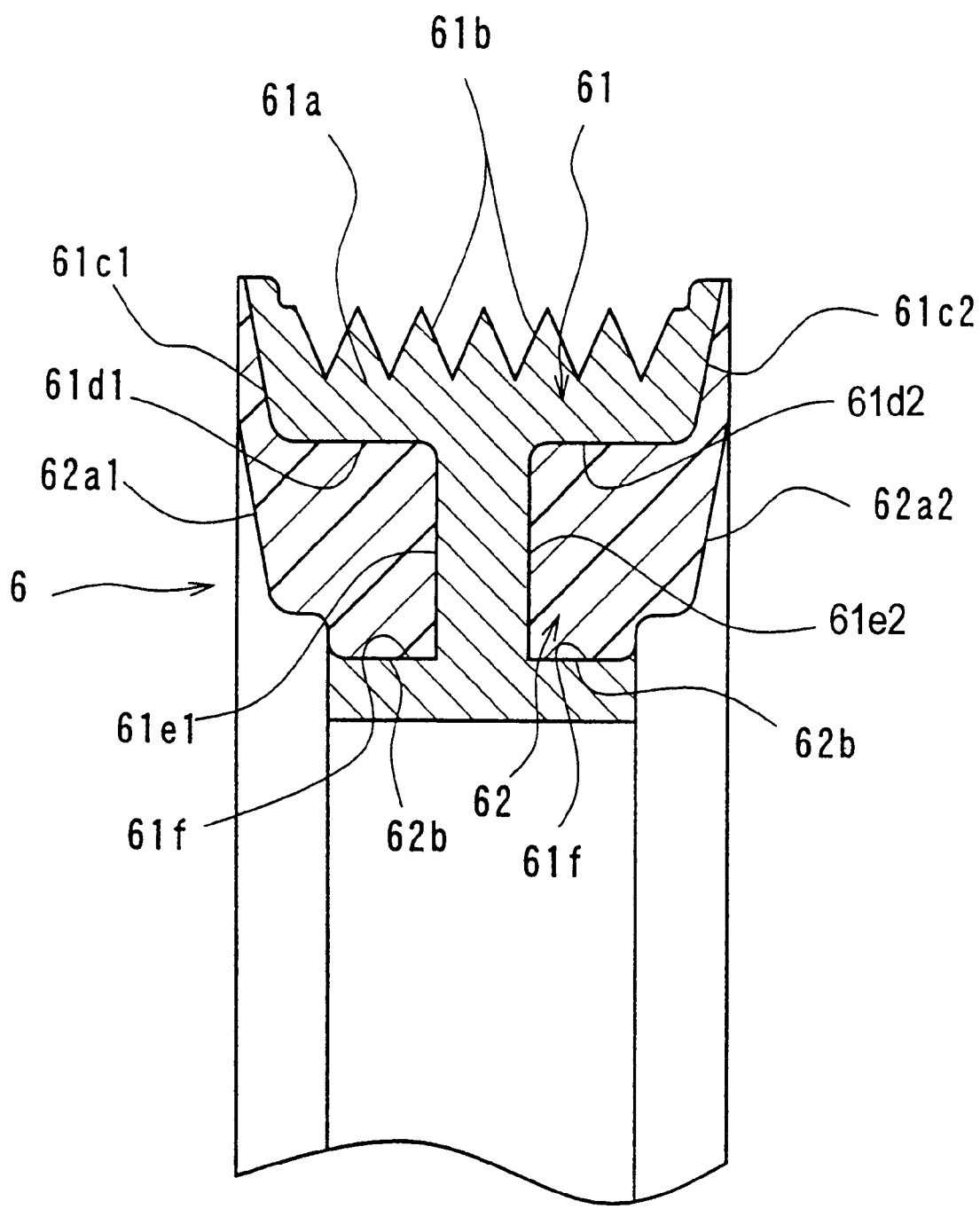
FIG. 8 is an enlarged sectional view showing an essential part of a power transmission ring depicted in FIG. 7.

FIG. 7 is a sectional view showing a variable diameter pulley assembly according to a second embodiment of the present invention, whereas FIG. 8 is an enlarged sectional view showing an essential part of a power transmission ring depicted in FIG. 7. Similarly to that of the first embodiment, a power transmission ring 6 of this embodiment is reinforced by embedding a metallic ring 61, such as formed of iron or an aluminum alloy, in a plastic ring 62 between first and second raceway surfaces 62a1, 62a2 formed on one and the other of lateral surfaces thereof. The metallic ring 61 and the plastic ring 62 are unified during the insert molding of the plastic ring 62. In FIGS. 7 and 8, a belt-engagement portion 61a; V-grooves 61b; first and second tapered surfaces 61c1, 61c2; first and second inner peripheral surfaces 61d1, 61d2; and first and second lateral surfaces 61e1, 61e2 of the metallic ring 61 correspond to the respective parts 31a to 31e1, 31e2 of the first embodiment. The first and second raceway surfaces 62a1, 62a2 of the plastic ring 62 correspond to the similar first and second raceway surfaces 32a1, 32a2 of the first embodiment, respectively. The other parts are represented by the same reference characters, respectively, and the description thereof is dispensed with.

A difference from the power transmission ring 3 of the first embodiment is that the metallic ring 61 is provided with a support surface 61f joined to an inner peripheral surface 62b of the plastic ring 62 for supporting the plastic ring 62.

More specifically, the metallic ring 61 is substantially of an I-shaped sectional form, as shown in FIGS. 7 and 8. The metallic ring 61 is embedded in the plastic ring 62 as allowing its outer periphery and inside diameter portion to be exposed from the plastic ring 62. The metallic ring 61 includes, for example, the annular support surface 61f which is joined to the inner peripheral surface 62b of the plastic ring 62 thereby to support the plastic ring 62. The provision of such a support surface 61f ensures that the plastic ring 62 is supported by the support surface 61f joined to the inner peripheral surface 62b thereof even if the shrinkage of the insert molded plastic ring 62 is greater than that of the metallic ring 61. This allows for the elimination of the bonding operation. In addition, the step for roughening by knurling the bond surface between the metallic ring 61 and the plastic ring 62 may also be dispensed with.

In the power transmission rings 3, 6 of the first and second embodiments, some material for or dimensions of the metallic ring 31, 61 or the plastic ring 31, 62 may involve a case where the tapered angles of the raceway surfaces 32a1, 32a2, 62a1, 62a2 vary among insert molded products because of the difference in the amounts of shrinkage of the metallic ring 31, 61 and the plastic ring 31, 62. This results in an increased number of fabrication steps because a finishing work such as cutting work need be applied to the raceway surfaces 32a1, 32a2, 62a1, 62a2. The following third embodiment negates the need for such a finishing work.

Third Embodiment

Figure 9:
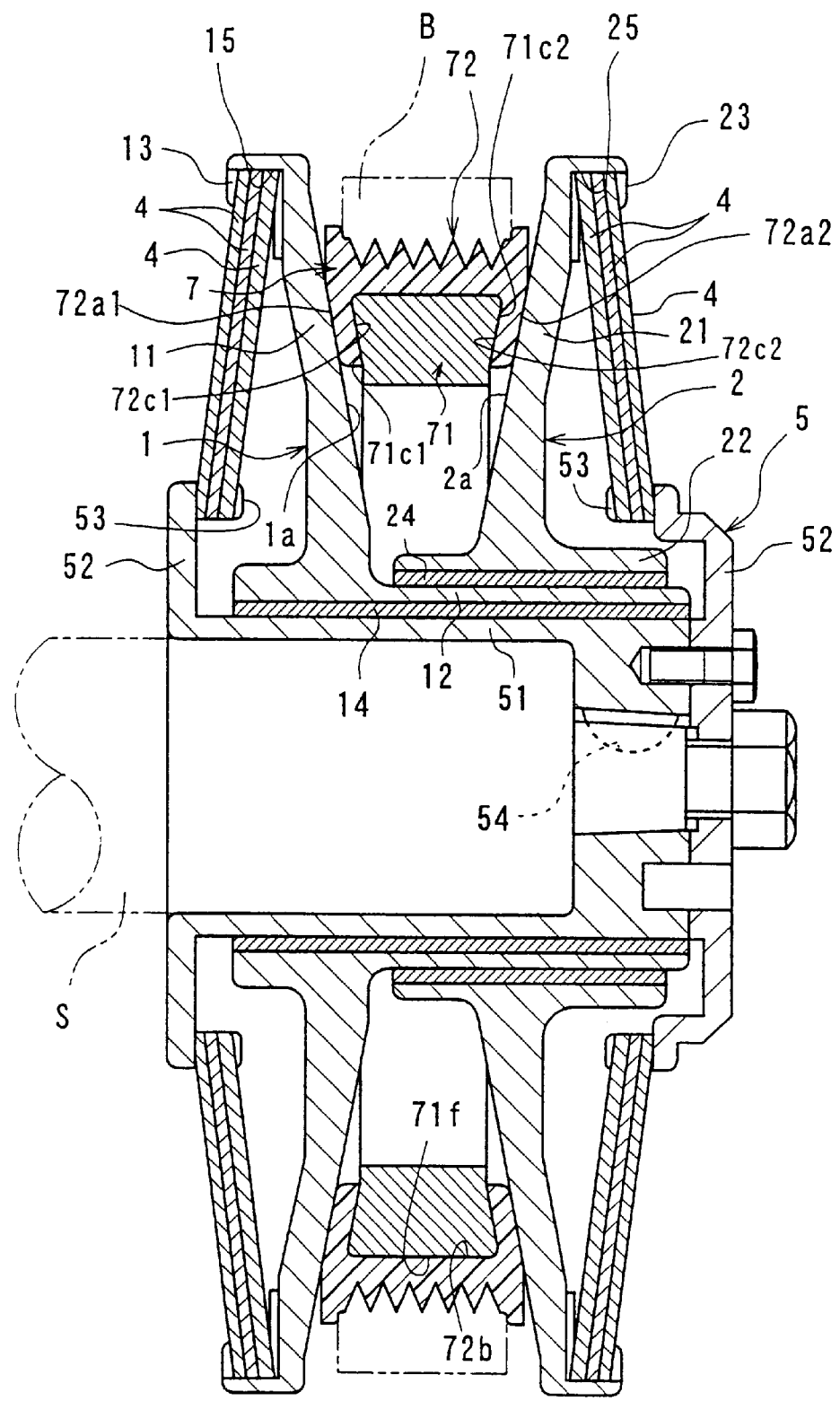
FIG. 9 is a sectional view showing a variable diameter pulley assembly according to a third embodiment of the present invention.
Figure 10:
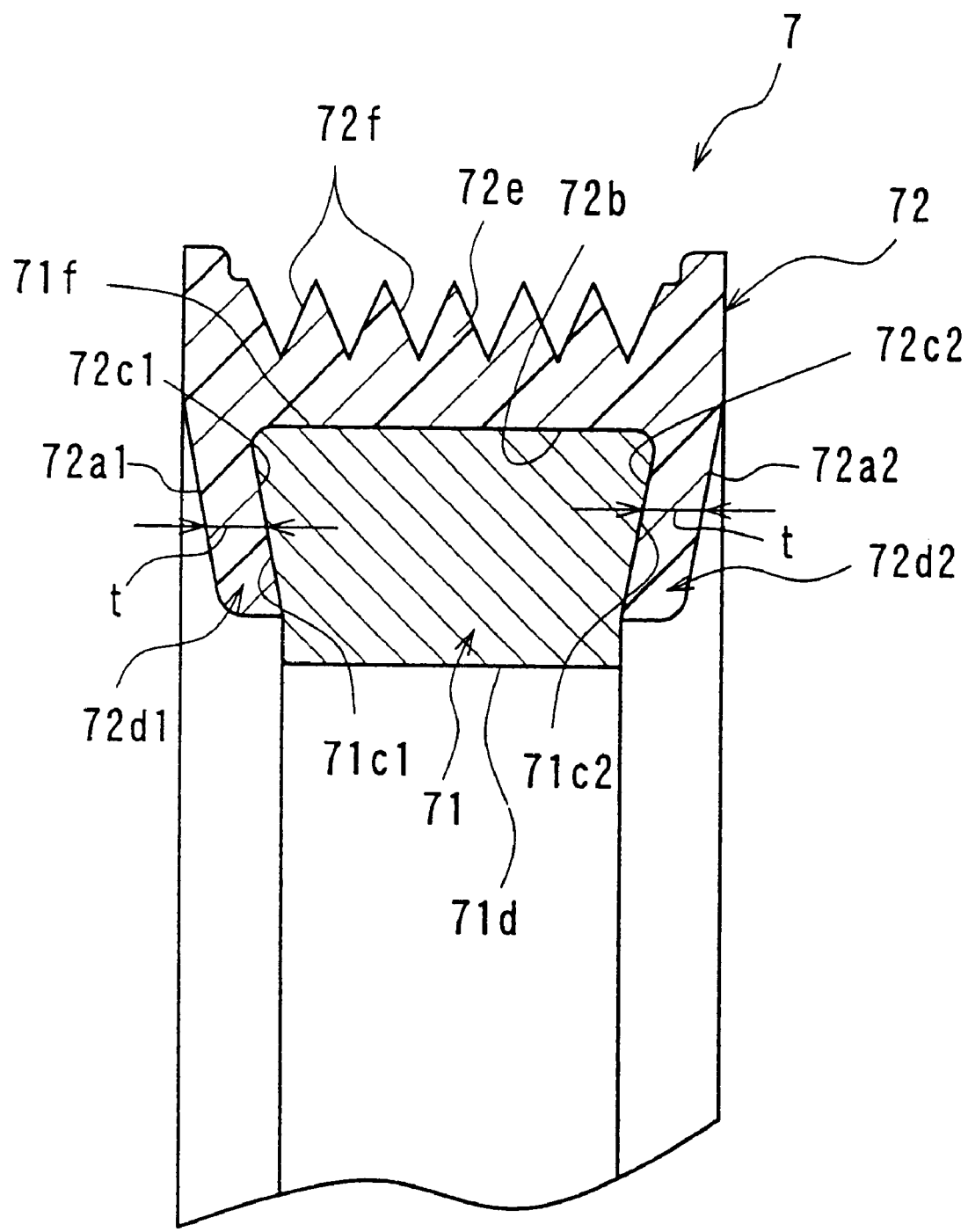
FIG. 10 is an enlarged sectional view showing an essential part of a power transmission ring depicted in FIG. 9.

FIG. 9 is a sectional view showing a variable diameter pulley assembly according to a third embodiment of the present invention, whereas FIG. 10 is an enlarged sectional view showing an essential part of a power transmission ring depicted in FIG. 9. Referring to FIGS. 9 and 10, a principal difference between this embodiment and the second embodiment is that a plastic ring 72 is provided with first and second annular planes 72c1, 72c2 formed on opposite sides of the respective first and second raceway surfaces 72a1, 72a2 in parallel relation therewith and joined to the respective first and second tapered surfaces 71c1, 71c2 of a metallic ring 71. Moreover, in the plastic ring 72, first and second raceway portions 72d1, 72d2 are enclosed between the first and second raceway surfaces 72a1, 72a2 and the first and second annular planes 72c1, 72c2, respectively, and have the same axial thickness. A power transmission ring 7 differs from those of the first and second embodiments in that the plastic ring 72 is provided with a belt-engagement portion 72e having a plurality of V-grooves 72f. Hereinafter, like parts to those of the second embodiment will be represented by the same reference characters, respectively, and the description thereof will be dispensed with.

More specifically, the power transmission ring 7 includes the metallic ring 71 and the plastic ring 72 unified with the metallic ring 71 via both sides and an outer periphery of the metallic ring 71, as shown in FIGS. 9 and 10. The metallic ring 71 is constructed from iron or an aluminum alloy and unified with the plastic ring 72 as allowing its inner peripheral surface 71d projected outwardly of the plastic ring 72. One and the other of lateral surfaces of the metallic ring 71 are formed with the first and second tapered surfaces 71c1, 71c2 in parallel relation with the first and second power transmission surfaces 1a, 2a, respectively. An outer peripheral surface of the metallic ring 71 defines a support surface 71f joined to an inner peripheral surface 72b (to be described hereinlater) of the plastic ring 72 for supporting the plastic ring 72. Similarly to the second embodiment, this ensures that the plastic ring 72 is supported by the support surface 71f joined to the inner peripheral surface 72b thereof even if the shrinkage of the insert molded plastic ring 72 is greater than that of the metallic ring 71. This allows for the elimination of the bonding operation. In addition, the step for roughening by knurling the bond surface between the metallic ring 71 and the plastic ring 72 may also be dispensed with.

The plastic ring 72 is an annular member formed with the belt-engagement portion 72e on its outer peripheral side and the first and second raceway portions 72d1, 72d2 on its inner peripheral side. The belt-engagement portion 72e is formed with a plurality of V-grooves 72f in its outer periphery for receiving ribs on the inner periphery of the belt B.

Outside surfaces of the first and second raceway portions 72d1, 72d2 define the first and second raceway surfaces 72a1, 72a2, respectively, whereas inside surfaces thereof define the first and second annular planes 72c1, 72c2, respectively. The first and second annular planes 72c1, 72c2 are joined to the first and second tapered surfaces 71c1, 71c2 of the metallic ring 71, respectively. The first and second raceway surfaces 72a1, 72a2 are tapered surfaces in parallel relation with the first and second power transmission surfaces 1a, 2a, respectively, whereas the first and second annular planes 72c1, 72c2 are tapered surfaces in parallel relation with the first and second raceway surfaces 72a1, 72a2, respectively. Therefore, the first and second raceway surfaces 72a1, 72a2 and the first and second annular planes 72c1, 72c2 as well as the first and second tapered surfaces 71c1, 71c2 of the metallic ring 71 are in parallel relation. And thereby, the first and second raceway portions 72d1, 72d2, which are enclosed between the respective first and second raceway surfaces 72a1, 72a2 and the respective first and second annular planes 72c1, 72c2, extend from the outer peripheral side to the inner peripheral side in the same axial thickness t (FIG. 10). The plastic ring 72 includes the inner peripheral surface 72b continuous to the first and second annular planes 72c1, 72c2 at opposite ends thereof and joined to the support surface 71f of the metallic ring 71.

In the variable diameter pulley assembly of the above configuration according to the third embodiment, the first and second race way portions 72d1, 72d2 of the plastic ring 72 extend from the outer peripheral side to the inner peripheral side in the same axial thickness t. Accordingly, the molded first and second raceway portions 72d1, 72d2 may present a uniform shrinkage amount.

Figure 11:
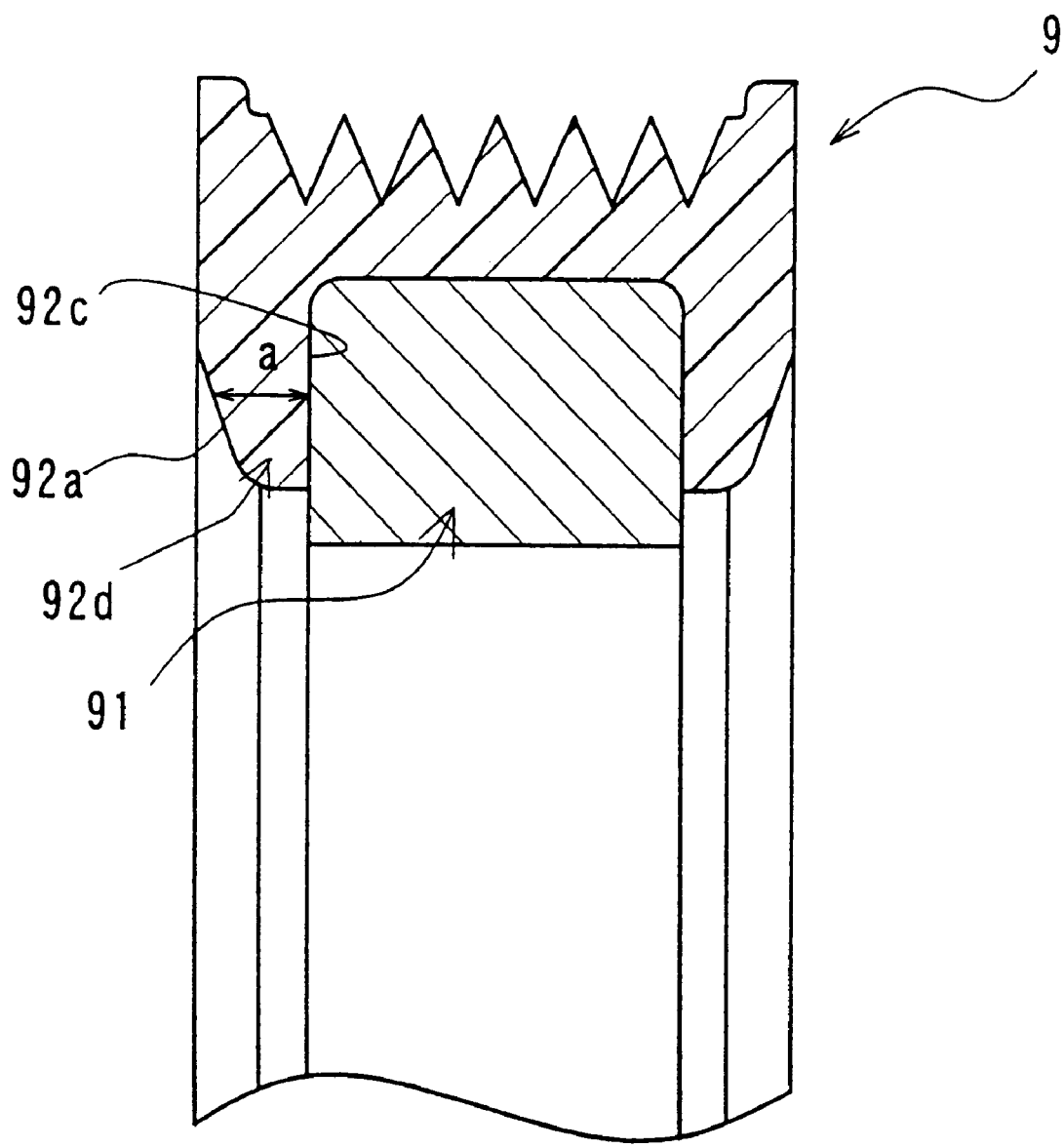
FIG. 11 is a diagram explanatory of a cause of variations in a tapered angle of a raceway surface of the plastic ring.

More specifically, where a power transmission ring 9 is configured such that a metallic ring 91 of a rectangular sectional shape is embedded in a plastic ring 92 and that an annular plane 92c of the plastic ring 92 is not formed in parallel with a raceway surface 92a, as shown in FIG. 11 for example. In this case, a raceway portion 92d enclosed between the annular plane 92c and the raceway surface 92a has different axial thicknesses a on the outer peripheral side and the inner peripheral side corresponding to the tapering of the raceway surface 92a. Therefore, the molded raceway portion 92d may sometimes present different amounts of shrinkage at the outer peripheral side and the inner peripheral side. This may lead to significant variations of the tapered angle of the raceway surface 92a among molded products. As a result, the molded raceway surface 92a must be finished by cutting work.

In contrast, the power transmission ring 7 of the embodiment provides a uniform amount of shrinkage of the molded first and second raceway portions 72d1, 72d2, so that the precision of the tapered angle of the raceway surface 72a can preferably be accomplished only by the resin molding process. This negates the need for finishing the raceway surface 72a by cutting work and hence, a fabrication process for the power transmission ring 7 may be accordingly simplified.

The foregoing description explained the configuration wherein the inner peripheral surface 71d of the metallic ring 71 projects outwardly of the plastic ring 72. However, the power transmission ring 7 may be configured such that the metallic ring 71 is completely covered by the plastic ring 72.

Figure 12:
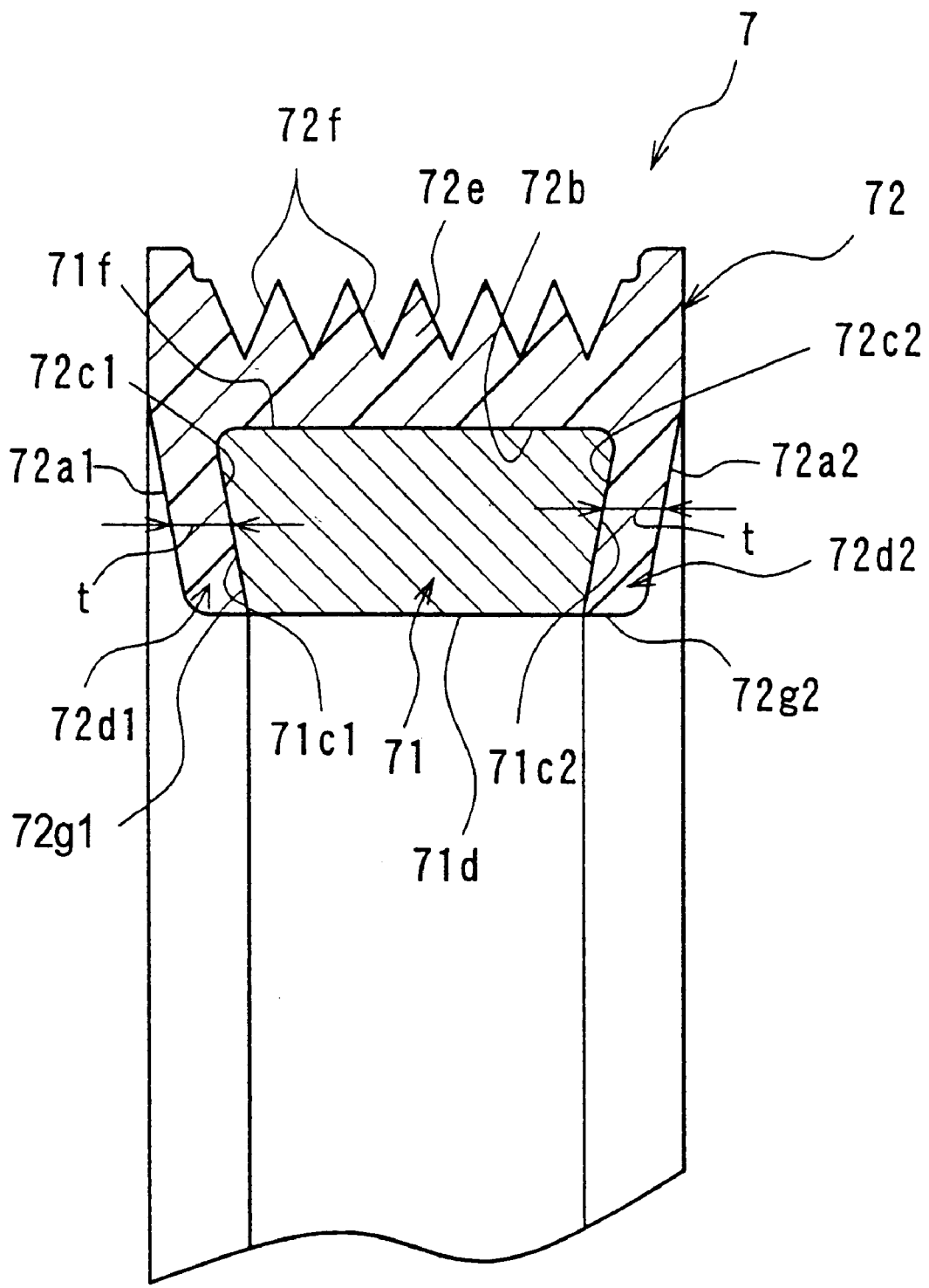
FIG. 12 is an enlarged sectional view showing an essential part of a modification of the power transmission ring of FIG. 9.

As shown in FIG. 12, for example, an alternative configuration may be made wherein the inner peripheral surface 71d is formed flush with first and second ring-like inner peripheral surfaces 72g1, 72g2 of the plastic ring 72 so as not to project outwardly of the plastic ring 72. The ring-like inner peripheral surfaces 72g1, 72g2 are each continuous to a corresponding one of the raceway surfaces 72a1, 72a2 of the raceway portions 72d1, 72d2 and to a corresponding one of the annular planes 72c1, 72c2 at one end and the other end thereof.

Figure 13:
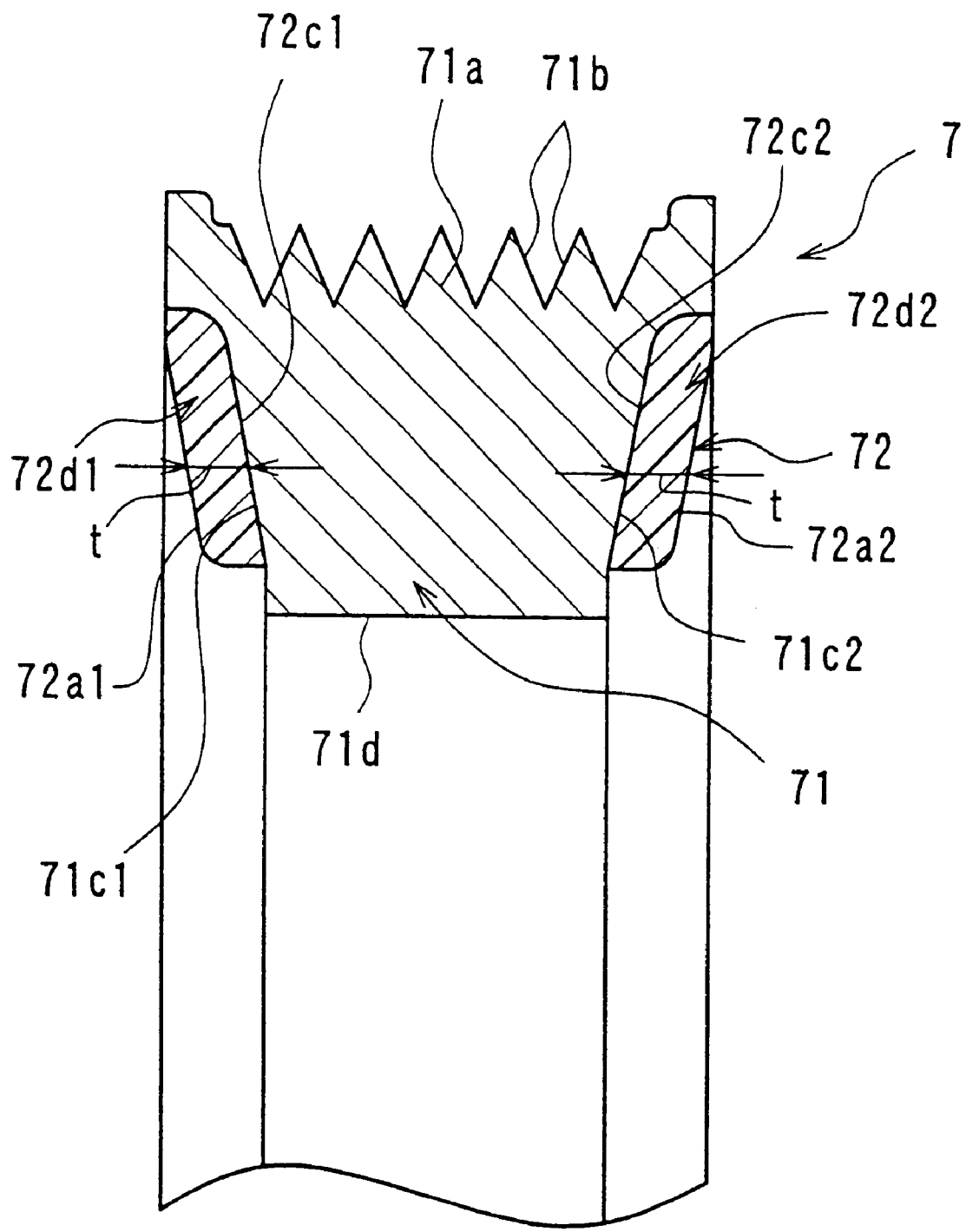
FIG. 13 is an enlarged sectional view showing an essential part of another modification of the power transmission ring of FIG. 9.
Figure 14:
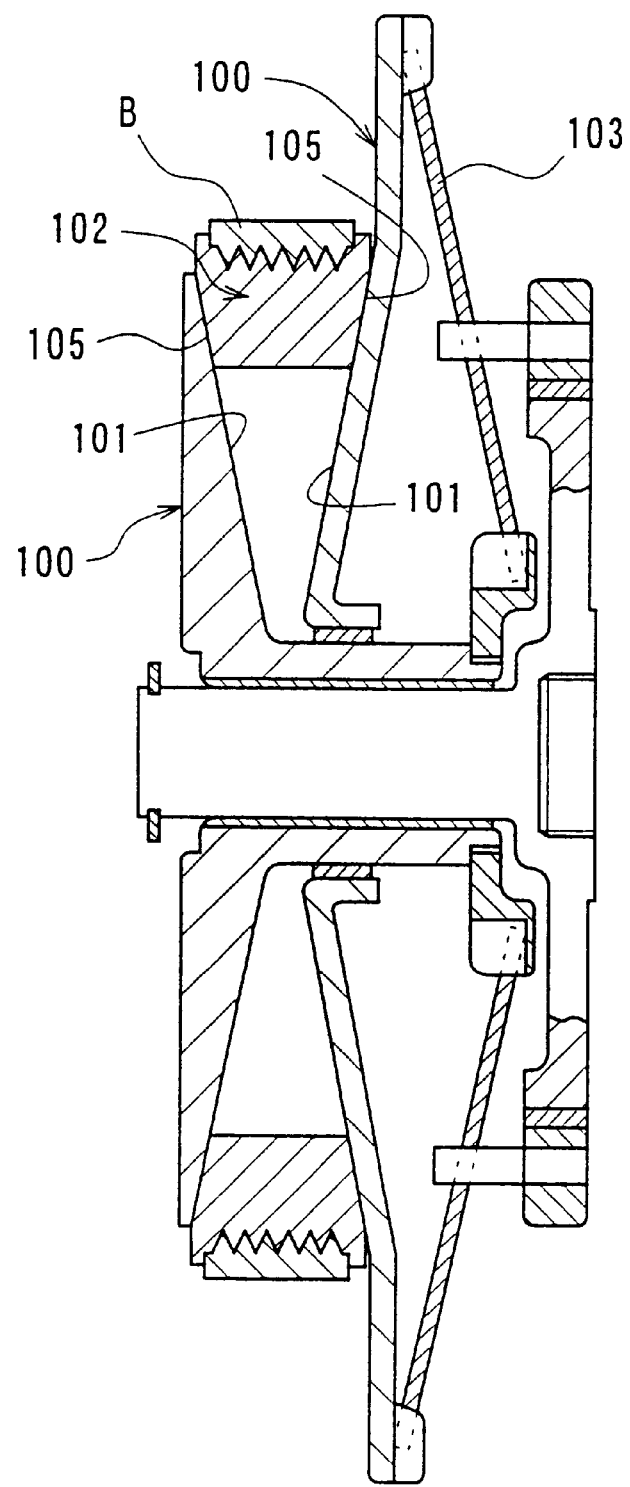
FIG. 14 is a sectional view showing a conventional variable diameter pulley assembly.

As shown in FIG. 13, a configuration may also be made wherein the belt-engagement portion 72e (FIG. 12) formed at the plastic ring 72 may be formed at the metallic ring 71. In short, the plastic ring 72 only need to include at least the first and second raceway portions 72d1, 72d2. Similarly to the first embodiment, the power transmission ring 7 shown in FIG. 13 may suffer the production of the gap between the metallic ring 71 and the plastic ring 72 depending upon the material for or dimensions of the metallic ring 71 or the plastic ring 72. Accordingly, it is preferred that the joined surface between the metallic ring 71 and the plastic ring 72 is roughened or that the metallic ring 71 is provided with a support surface for supporting the ring-like inner peripheral surfaces 72g1, 72g2 of the plastic ring 72.

It is to be noted that various design modifications may be made to the variable diameter pulley assembly of the invention. For instance, either one of the sheaves 1, 2 may be biased by the coned disk spring 4.

What is claimed is:

1. A power transmission ring comprising:

an outer periphery which, when said power transmission ring is in operation, has a belt of a power transmission system looped thereover;

a plastic ring dimensioned to be held between first and second power transmission surfaces of the power transmission system, each of the first and second transmission surfaces being formed on a corresponding lateral surface of first and second sheaves of the power transmission system opposed to each other and allowed to be decentered relative to an axis of the first and second sheaves, said plastic ring having first and second tapered raceway surfaces on lateral surfaces thereof which are designed to be in parallel relation with the first and second power transmission surfaces, respectively, and to allow said first and second raceway surfaces to be contacted by the first and second power transmission surfaces, respectively, when said power transmission ring is in operation; and a metallic ring having first and second tapered surfaces formed on opposite lateral surfaces thereof in parallel relation with the first and second raceway surfaces, respectively, and unified with the plastic ring.

2. The power transmission ring as claimed in claim 1, wherein said first and second tapered surfaces are embedded in the plastic ring so as to come into contact with said first and second power transmission surfaces, respectively, in the event of a breakage of said plastic ring.

3. The power transmission ring as claimed in claim 1, wherein said metallic ring is provided with a support surface joined to an inner peripheral surface of said plastic ring for supporting the plastic ring.

4. The power transmission ring as claimed in claim 3, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

5. The power transmission ring as claimed in claim 1, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

6. The power transmission ring as claimed in claim 1, wherein said metallic ring is provided with a support surface joined to an inner peripheral surface of said plastic ring for supporting the plastic ring.

7. The power transmission ring as claimed in claim 6, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

8. The power transmission ring as claimed in claim 1, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

9. A variable diameter pulley assembly comprising:

first and second sheaves axially relatively movable as presenting first and second power transmission surfaces to each other, the power transmission surfaces each formed on a corresponding lateral surface of the first and second sheaves;

a resilient member for biasing at least one of the sheaves toward the other; and a power transmission ring including:
     an outer periphery which, when said power transmission ring is in operation, has a belt of a power transmission system looped thereover;
     a plastic ring held between the first and second power transmission surfaces which are allowed to be decentered relative to an axis of the first and second sheaves, said plastic ring having first and second tapered raceway surfaces formed on lateral surfaces thereof in parallel relation with the first and second power transmission surfaces, respectively, and so as to allow the first and second raceway surfaces to be contacted by the first and second power transmission surfaces, respectively; and
     a metallic ring having first and second tapered surfaces formed on lateral surfaces thereof in parallel relation with the first and second raceway surfaces, respectively, and unified with the plastic ring.

10. The variable diameter pulley assembly as claimed in claim 9, wherein said first and second tapered surfaces are embedded in the plastic ring so as to come into contact with said first and second power transmission surfaces, respectively, in the event of a breakage of said plastic ring.

11. The variable diameter pulley assembly as claimed in claim 10, wherein said metallic ring is provided with a support surface joined to an inner peripheral surface of said plastic ring for supporting the plastic ring.

12. The variable diameter pulley assembly as claimed in claim 11, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

13. The variable diameter pulley assembly as claimed in claim 10, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

14. The variable diameter pulley assembly as claimed in claim 9, wherein said metallic ring is provided with a support surface joined to an inner peripheral surface of said plastic ring for supporting the plastic ring.

15. The variable diameter pulley assembly as claimed in claim 14, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

16. The variable diameter pulley assembly as claimed in claim 9, wherein said plastic ring is provided with first and second annular planes formed on an opposite side of said respective first and second raceway surfaces in parallel relation therewith and joined to said respective first and second tapered surfaces, and wherein first and second raceway portions are enclosed between said first and second raceway surfaces and said first and second annular planes, respectively, and have the same axial thickness.

17. A power transmission ring comprising:

a plastic ring having first and second raceway surfaces adapted for contact with first and second power transmission surfaces of sheaves of a power transmission, respectively, and said power transmission ring further comprising;

first and second tapered surfaces formed so as to be in parallel relation with both the respective first and second raceway surfaces and the respective first and second power transmission surfaces.

18. The power transmission ring as claimed in claim 17, wherein said first and second tapered surfaces are embedded in the plastic ring so as to come into contact with the first and second power transmission surfaces, respectively, in the event of a breakage of said plastic ring.

19. The power transmission ring as claimed in claim 18, wherein said first and second tapered surfaces are each provided with a support surface joined to an inner peripheral surface of said plastic ring for supporting the plastic ring.

20. The power transmission ring as claimed in claim 17, wherein said first and second tapered surfaces are each provided with a support surface joined to an inner peripheral surface of said plastic ring for supporting the plastic ring.

* * * * *